Nov. 16, 1954  R. W. NORRIS  2,694,543
MIRROR SUPPORT DEVICE
Filed Dec. 19, 1950

INVENTOR
Raymond W. Norris

BY Burns, Doane + Benedict
ATTORNEYS

United States Patent Office 2,694,543
Patented Nov. 16, 1954

2,694,543

MIRROR SUPPORT DEVICE

Raymond W. Norris, Warren, Pa.

Application December 19, 1950, Serial No. 201,594

3 Claims. (Cl. 248—226)

The present invention relates to a new and improved mirror supporting assembly.

Present furniture styles do not permit the mirrors to constitute integral or permanently attached portions of dressers or the like. It is therefore necessary to provide some extraneous means for associating a mirror with a dresser or other article of furniture when such association is desirable. A common practice among furniture manufacturers is to merely supply the mirror together with eye screws and picture wire. Purchasers of the mirror must hang the mirror from the wall in an appropriate position above the article of furniture. Many real estate leases contain provisions which prohibit the tenant from placing any type of fastener in a wall or otherwise disfiguring the wall. Even in the absence of such lease provisions, many homemakers are reluctant to disfigure walls and hence dislike the idea of hanging a mirror on the wall. There is a further disadvantage that many mirrors are quite heavy and cannot be safely hung on a wall except by the use of a hanger which is expertly applied to the wall.

I overcome the foregoing disadvantages by providing an assembly which enables the mirror to be easily and quickly attached to the dresser or other article of furniture in a secure, safe and adjustable manner. The assembly can be applied by unskilled labor with simple tools. The mirror can be made vertically adjustable relative to the dresser, but at the same time the mirror will be rigidly secured in the adjusted position desired.

Further objects and advantages of my invention are to provide a particularly effective clamping arrangement for mirror supports and the like. Still another object is to provide a mirror supporting assembly which can be repeatedly adjusted without damage to any element of the assembly.

Figure 1:
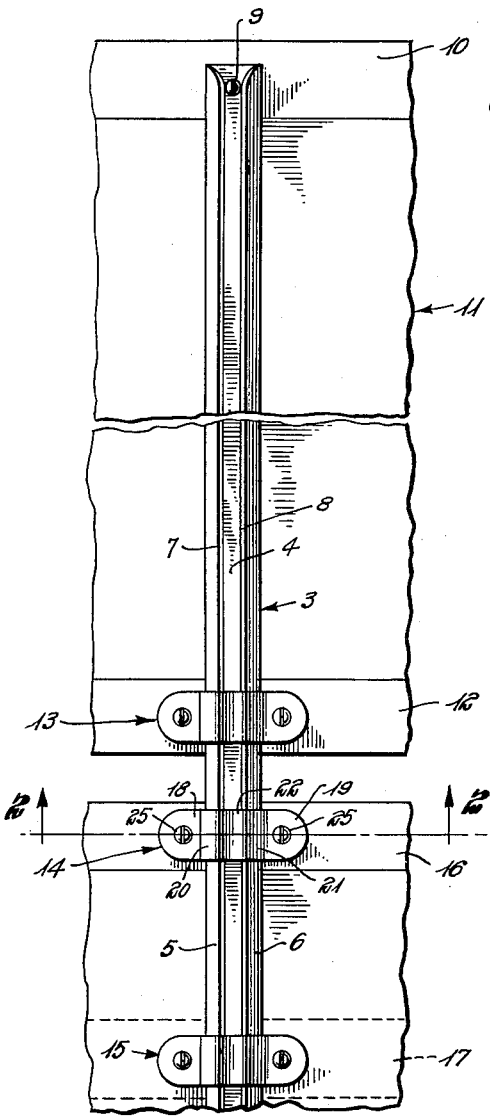
Figure 2:
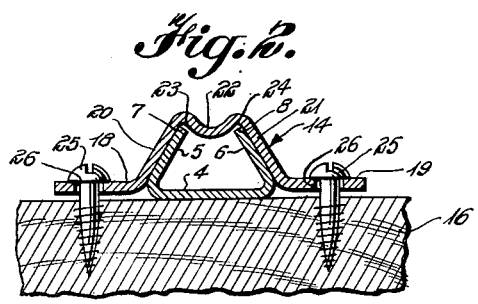

The foregoing and other objects and advantages of the invention will be better understood by reference to the following detailed description which has reference to the accompanying drawings, wherein:

Figure 1 is a rear elevational view of an article of furniture having a mirror secured thereto by the assembly of the present invention, and Figure 2 is a sectional view taken in the direction of the arrows along the line 2—2 of Figure 1.

I provide a channel member designated generally by the reference numeral 3. This channel member has a flat or plane base portion 4 and side flange portions 5 and 6 which diverge outwardly from the base portion 4 to terminate in laterally spaced edges 7 and 8.

The channel member 3 preferably has an aperture in its upper end for reception of a screw 9 by which the upper end of the channel member can be secured to the upper frame member 10 of a mirror which is designated generally by the reference numeral 11. The channel member 3 may be secured to the lower frame member 12 of the mirror 11 by any suitable means but I prefer to utilize a clamping bracket such as those which are used to secure the channel member to the dresser or other article of furniture.

I have illustrated three such clamping brackets, the clamping bracket 13 being used for securing the channel member to the lower frame member 12 of the mirror while the clamping brackets 14 and 15 are used to clamp the channel member 3 in the rear edge 16 of the dresser top and to the drawer rail 17, respectively.

The clamping brackets are formed from strips of stiff sheet metal. The details of the clamping brackets 14 are best shown in Figure 2 and since the brackets are identical, a description of the clamping bracket 14 will be sufficient. The bracket is provided with end portions 18 and 19 which lie in a common plane. Intermediate portions 20 and 21 converge upwardly from the end portions 18 and 19. The central portion 22 is bowed or arched inwardly so that it may lie between the laterally spaced edges 7 and 8 of the flanges 5 and 6 of the channel member.

The angular positions of the flanges 5 and 6 of the channel member 3 are such relative to the intermediate portions 20 and 21 of the clamping brackets that there is flush surface contact between these portions of the assembly. The dimensions of the elements are such that this surface contact occurs while the end portions 18 and 19 are substantially spaced from the wooden member 16 or other member against which the base 4 of the channel 3 is clamped. The dimensions of the elements should also be such that the laterally spaced edges 7 and 8 of flanges 5 and 6 terminate short of the interior corners 23 and 24 between the central portion 22 and the intermediate portions 20 and 21 of the clamping brackets.

The wood screws 25 which extend through apertures 26 in the end portions of the clamping brackets may be relatively small since they are subjected to light stresses. This enables the assembly to be used with mirrors having small or fragile frames. It also eliminates the need for large screw holes in the mirror or the article of furniture. The arrangement which I have described provides a highly efficient clamping assembly. There is no distortion or injury of the elements of the assembly even after repeated adjustments.

The inwardly bowed or arched central portion 22 of the clamping bracket has been found to be essential in obtaining the efficient clamping action. This reverse curvature or inward arching or bowing of the central portion appears to stiffen the central portion of the clamping bracket but I do not believe that feature to be solely responsible for the enumerated advantages. I believe that when the screws 25 are tightened, tensile stresses are applied to the intermediate portions 20 and 21 of the clamping bracket. Those tensile stresses have a tendency to place the central portion 22 in tension with the result that there is a tendency to straighten the central portion of the bracket. This tendency towards straightening and elongation of the central portion 22 tends to position the inner corners 23 and 24 farther apart and there is thus no tendency to concentrate the stresses at the edges 7 and 8 of the flanges 5 and 6. This elimination of concentration of stresses seems to permit more or less uniform distribution of forces on the engaging surfaces of the clamping bracket and the flanges of the channel members. The base portion 4 of the channel member 3 is pressed rigidly against the adjacent wooden member and the friction between those members assists in preventing movement of the channel member.

I have illustrated and described what I now consider to be the preferred form of my invention. It will be understood, however, that certain alterations and modifications may be resorted to without departing from the broader aspects of the invention as defined by the following claims.

I claim:

1. A mirror support comprising a channel member having a flat base portion for engaging the back of an article of furniture and for engaging the back of a mirror, said channel member having side flange portions which converge rearwardly from said base portion to terminate in laterally spaced rearward edges, a clamping bracket having end portions for attachment to the back of the article of furniture on either side of said channel member, said bracket having intermediate portions which converge rearwardly in parallel relation with said side flange portions, and said bracket having a central portion which bows inwardly between the rearward edges of said side flange portions, and means for securing said end portions of said bracket to the article of furniture to secure said channel member thereto, said end portions of said bracket being substantially spaced from the article of furniture when said intermediate portions of said bracket make frictional contact with said flanges.

2. A mirror support comprising an elongated channel member having a base for engaging the back of an article of furniture and for engaging the back of a mirror, said channel member having side flanges which converge outwardly from said base to terminate in laterally spaced edges, a clamping bracket for extending transversely of said channel member and clamping the same to an article of furniture, said clamping bracket having opposite end portions lying in a common plane, intermediate portions of said bracket extending outwardly to lie in parallel clamping contact with the outer surfaces of said side flanges, and the central portion of said bracket being arched inwardly to lie between said laterally spaced edges of said side flanges, and means for securing said opposite end portions of said bracket to an article of furniture, said intermediate portions of said bracket frictionally engaging said side flanges while the common plane of said end portions of said bracket is substantially spaced rearwardly out of contact with the back of the article of furniture.

3. A mirror support comprising a channel member having a base portion for engaging the back of an article of furniture and for engaging the back of a mirror, said channel member having side flange portions which converge outwardly from said base portion to terminate in laterally spaced edges, a clamping bracket having a central portion which is inwardly arched to lie between the spaced outer ends of said side flanges, the portions of said bracket on either side of said central portion extending in directions to lie in parallel engagement with the outer surfaces of said flanges, the ends of said bracket lying in a common plane which is parallel to the base of said channel member, and means for securing said ends of said bracket to an article of furniture for clamping said channel member thereto, said portions of said bracket on either side of said central portion frictionally engaging said side flanges while said common plane of said ends of said bracket is spaced outwardly of the plane of the base portion of said channel member.

References Cited in the file of this patent

UNITED STATES PATENTS

| Number | Name | Date |
|---|---|---|
| 1,491,059 | Otten et al. | Apr. 22, 1924 |
| 1,980,149 | Zink | Nov. 6, 1934 |
| 2,168,003 | Stone | Aug. 1, 1939 |
| 2,309,769 | Hubbard | Feb. 2, 1943 |
| 2,313,532 | Garrett | Mar. 9, 1943 |
| 2,607,553 | Garrett | Aug. 19, 1952 |